US011108700B2

(12) United States Patent
Zhu et al.

(10) Patent No.: US 11,108,700 B2
(45) Date of Patent: Aug. 31, 2021

(54) METHOD AND SYSTEM TO IMPLEMENT MESSAGING FOR CLUSTER ELECTIONS

(71) Applicant: Oracle International Corporation, Redwood Shores, CA (US)

(72) Inventors: Ming Zhu, Redwood City, CA (US); Mahesh Kallanagoudar, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/457,368

(22) Filed: Jun. 28, 2019

(65) Prior Publication Data

US 2020/0412662 A1    Dec. 31, 2020

(51) Int. Cl.
| | |
|---|---|
| *G06F 15/16* | (2006.01) |
| *H04L 12/863* | (2013.01) |
| *H04L 12/58* | (2006.01) |
| *G06F 15/173* | (2006.01) |

(52) U.S. Cl.
CPC .......... *H04L 47/6295* (2013.01); *H04L 51/26* (2013.01)

(58) Field of Classification Search
CPC ............................. H04L 47/6295; H04L 51/26
USPC ......................................................... 709/207
See application file for complete search history.

(56) References Cited

U.S. PATENT DOCUMENTS

| | | | | |
|---|---|---|---|---|
| 6,192,401 | B1 * | 2/2001 | Modiri ................... | G06F 9/5061 370/254 |
| 7,287,180 | B1 * | 10/2007 | Chen ................... | G06F 11/2033 714/11 |
| 7,464,147 | B1 * | 12/2008 | Fakhouri ................ | G06Q 10/06 709/223 |
| 8,041,773 | B2 * | 10/2011 | Abu-Ghazaleh ........ | H04L 41/12 709/209 |
| 8,055,735 | B2 * | 11/2011 | Krishnappa ............. | G06F 15/16 709/220 |
| 8,493,978 | B2 * | 7/2013 | Arribas ................. | H04L 67/101 370/390 |
| 8,965,921 | B2 * | 2/2015 | Gajic ...................... | G06F 16/20 707/770 |
| 9,201,742 | B2 * | 12/2015 | Bulkowski ............ | G06F 11/183 |
| 9,448,966 | B2 * | 9/2016 | Varakur ............... | G06F 11/1425 |
| 9,672,115 | B2 * | 6/2017 | Earl ....................... | G06F 11/202 |
| 9,692,820 | B2 * | 6/2017 | Chaudhary .......... | H04L 67/1002 |
| 9,774,401 | B1 * | 9/2017 | Borrill .................. | H04L 9/0852 |
| 9,800,549 | B2 * | 10/2017 | Leung ................. | H04L 63/0254 |
| 9,805,108 | B2 * | 10/2017 | Merriman ............. | G06F 16/273 |
| 9,807,154 | B2 * | 10/2017 | Darling .................... | H04L 67/10 |
| 9,836,366 | B2 * | 12/2017 | Schatz ................ | G06F 11/2046 |
| 10,320,702 | B2 * | 6/2019 | Gahlot .................... | H04L 41/12 |

(Continued)

OTHER PUBLICATIONS

Wikipedia, "k-means clustering", Wikipedia, (Jun. 14, 2020).

(Continued)

*Primary Examiner* — Melvin H Pollack
(74) *Attorney, Agent, or Firm* — Vista IP Law Group, LLP

(57) ABSTRACT

Described is a system, method, and computer program product for performing elections in a database cluster, where cluster topology representations are distributed across the cluster nodes using a prioritized messaging protocol. The cluster topology representations may be implemented as connectivity bit-vector that provide information that identifies which nodes in the cluster are able to communicatively connect with other nodes.

21 Claims, 11 Drawing Sheets

(56) References Cited

U.S. PATENT DOCUMENTS

| | | | | |
|---|---|---|---|---|
| 10,331,801 | B2* | 6/2019 | Marsden | G06F 16/214 |
| 10,417,102 | B2* | 9/2019 | Sanakkayala | G06F 11/301 |
| 10,445,433 | B2* | 10/2019 | Srinivasan | G06F 16/24553 |
| 10,614,098 | B2* | 4/2020 | Horowitz | G06F 11/1471 |
| 10,678,457 | B2* | 6/2020 | Jawahar | G06F 3/0683 |
| 10,719,417 | B2* | 7/2020 | Wu | G06F 11/2023 |
| 10,725,883 | B2* | 7/2020 | Ganesan | G06F 9/45558 |
| 10,740,353 | B2* | 8/2020 | Horowitz | G06F 11/14 |
| 10,747,592 | B2* | 8/2020 | Kolodzieski | G06F 8/70 |
| 2007/0299950 | A1* | 12/2007 | Kulkarni | H04L 45/00 709/223 |
| 2017/0229868 | A1* | 8/2017 | Laval | H02J 13/00028 |
| 2017/0286518 | A1* | 10/2017 | Horowitz | G06F 16/273 |
| 2018/0097845 | A1* | 4/2018 | Chen | H04L 43/065 |
| 2019/0208011 | A1* | 7/2019 | Dutta | G06F 11/1464 |
| 2019/0306231 | A1* | 10/2019 | Shimoga Manjunatha | G06F 9/5083 |
| 2020/0028902 | A1* | 1/2020 | Rajagopalan | G06F 15/161 |
| 2020/0034245 | A1* | 1/2020 | Kohler | G06F 11/1458 |
| 2020/0097354 | A1* | 3/2020 | Barnett | G06F 11/0793 |
| 2020/0153898 | A1* | 5/2020 | Sabath | H04L 41/082 |

OTHER PUBLICATIONS

Amer, M. et al., "Nearest-Neighbor and Clustering based Anomaly Detection Algorithms for RapidMiner", Proceedings of the 3rd RapidMiner Community Meeting and Conferemce (RCOMM 2012), (Aug. 2012).

Wikipedia, "Priority queue", Wikipedia, (Jun. 9, 2019).

Strohm, R. et al., "Introduction to Oracle Clusterware", Oracle Clusterware Administration and Deployment Guide, 11g Release 2 (11.2), Oracle Help Center, (Jun. 2015).

Strohm, R. et al., "Redundant Interconnect Usage", Oracle Clusterware Administration and Deployment Guide, 12c Release 1(12.1), Oracle Help Center, (Jul. 2017).

Strohm, R. et al., "Overview of Oracle RAC Architecture and Processing", Oracle Clusterware Administration and Deployment Guide, 12c Release 1(12.1), Oracle Help Center, (Jul. 2017).

Bennage, C. et al., "Priority Queue pattern", Cloud Design Patterns, Micosoft Documents, (Jun. 23, 2017).

* cited by examiner

| Node Number | Connect bit for node 1 | Connect bit for node 2 | Connect bit for node 3 | Connect bit for node 4 |
|---|---|---|---|---|
| 1 | 1 | 0 | 1 | 0 |
| 2 | 0 | 1 | 1 | 1 |
| 3 | 1 | 1 | 1 | 1 |
| 4 | 0 | 1 | 1 | 1 |

Fig. 4

METHOD AND SYSTEM TO IMPLEMENT MESSAGING FOR CLUSTER ELECTIONS

CROSS REFERENCE TO RELATED APPLICATIONS

The present application is related to U.S. application Ser. No. 16/457,445, entitled "METHOD AND SYSTEM FOR TO IMPLEMENT CLUSTER FAILURE PREDICTION TO FACILITATE SPLIT BRAIN RESOLUTION", filed on even date herewith, which is hereby incorporated by reference in its entirety.

FIELD

This disclosure concerns a method, a computer program product, and a computer system for implementing database cluster systems.

BACKGROUND

A database clustering system allows the underlying servers within the computing infrastructure to communicate with each other so that they appear to function as a collective unit. Although the servers may be configured as standalone servers, each server has additional processes that communicate with other servers and where the different servers may access a shared/common set of database storage objects. The clustered database system therefore contains a shared architecture in which multiple running instances can each be used to manage a set of shared physical data files. Each of the database instances resides on a separate host and forms its own set of background processes and memory buffers, but in which the cluster infrastructure allows access to a single shared database via multiple database instances. In this way, the separate servers (e.g., nodes) appear as if they are one system to applications and end users.

In order for the database cluster to operate properly, these servers (e.g., nodes) will need to be able to communicate with one another in order to perform work. The database cluster as a whole cannot work properly if there is a breakdown of communications between the nodes. For example, many aspects of cluster interactions (e.g., lock management, cluster management, and status updates) cannot function properly if one or more nodes in the cluster are unable to communicate with the other nodes.

When a breakdown in communications occurs, there is often the need to identify which of the surviving nodes has been or should be designated as the "master" or "leader" node. To explain, consider the situation when a communications failure occurs in a cluster, and a large cluster ends up becoming two sub-clusters after the failure, where the members of one sub-cluster are unable to effectively communicate with members in the other sub-cluster. In this situation, it would not be feasible to allow each sub-cluster to continue operating independently of the other, since this may result in inconsistent data changes being applied by each sub-cluster. Therefore, a leadership election may need to be performed to identify a specific master node within one of the sub-clusters to initiate a reconfiguration of the cluster, where the sub-cluster having the elected master node survives while the nodes in the other sub-cluster are evicted. This allows the nodes in the remaining sub-cluster to continue operating in a data-consistent manner until the evicted nodes can be eventually brought up and correctly integrated into the surviving cluster. Therefore, the master/leader election in the event of a failure is a critical step, since this decision directly determines the composition and size of the surviving cluster.

Various approaches may be taken to identify the master node after a cluster failure. One possible approach that can be used is to identify the node having the smallest/lowest node ID within the cluster as the master node, on the assumption that the node having the smallest node ID value is the first or earliest node started in the cluster. This selection criteria can be used as a first order selection criteria, or as a tie breaker in the event of a tie from using other selection criteria. The problem is that this approach may be overly simplistic, and may not result in an optimal cluster. For example, it is often beneficial to have more nodes in a surviving cluster in a computing intensive architecture. However, due to communication traffic delays in a system, it is often very difficult to have accurate current statuses for the cluster nodes to know which sub-cluster has the highest number of nodes, and therefore the simplistic approach of selecting the master node with the smallest node ID may result in selection of a sub-cluster to survive having less members than a sub-cluster that is evicted.

Therefore, what is needed is an improved approach to implement elections in the event of a failure to a clustered database system.

SUMMARY

According to some embodiments, a system, method, and computer program product is provided to perform elections in a database cluster, where cluster topology representations are distributed across the cluster nodes using a prioritized messaging protocol. The cluster topology representations may be implemented as connectivity bit-vector that provide information that identifies which nodes in the cluster are able to communicatively connect with other nodes. After a failure, this information permits identification and election of a master node in a sub-cluster having the largest number of members that can talk to one another, where eviction can then take place for nodes in the other sub-cluster(s) having smaller number of members.

Further details of aspects, objects and advantages of the disclosure are described below in the detailed description, drawings and claims. Both the foregoing general description and the following detailed description are exemplary and explanatory, and are not intended to be limiting as to the scope of the disclosure.

BRIEF DESCRIPTION OF FIGURES

The drawings illustrate the design and utility of some embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope.

FIG. 4 shows an illustration of an embodiment of the invention with an example cluster configuration of a four node cluster.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

The present disclosure provides an improved system, computer program product and method, where cluster topology representations (e.g., implemented as a connectivity bit-vector) are distributed across the cluster nodes. A prioritized messaging protocol can be used to distribute the connectivity bit-vector. The connectivity bit-vector provides information that identifies which nodes in the cluster are able to communicatively connect with other nodes. After a failure, this information permits identification and election of a master node in a sub-cluster having the largest number of members that can talk to one another, where eviction can then take place for nodes in the other sub-cluster(s) having smaller number of members.

Figure 1A:
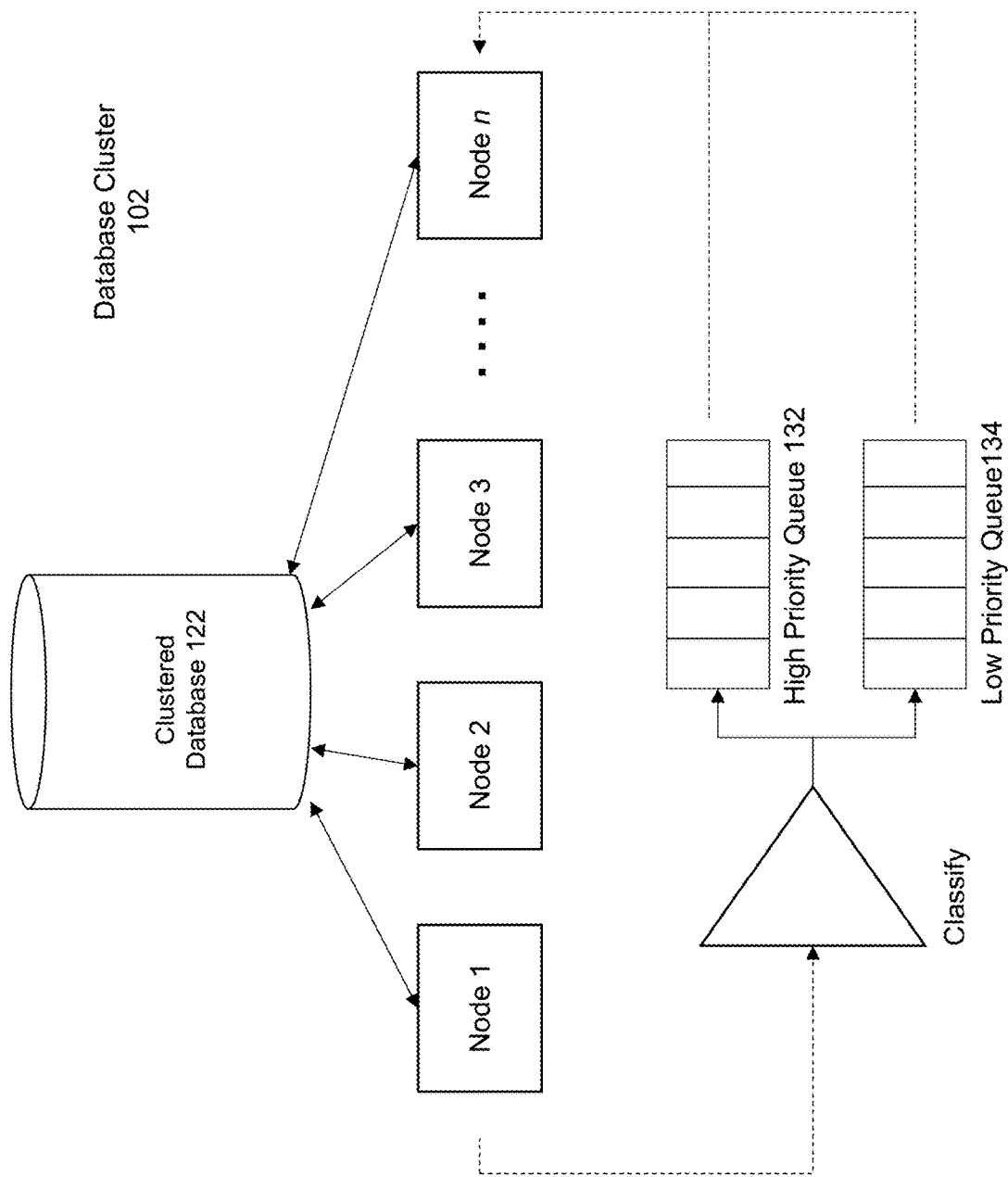
FIGS. 1A-1D show a system for implementing some embodiments of the invention.
Figure 1B:
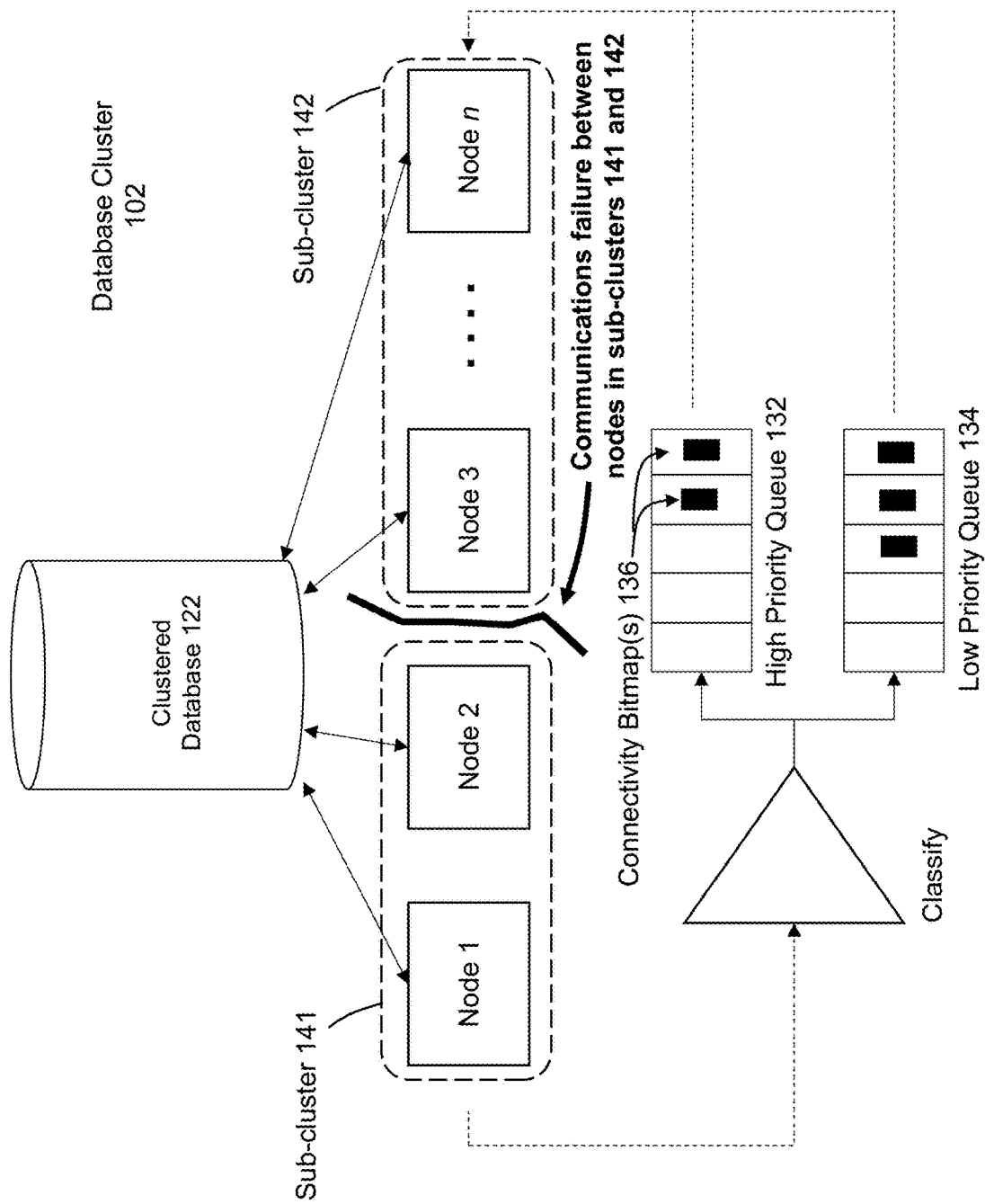

FIGS. 1A-D show a system for implementing some embodiments of the invention. As illustrated in FIG. 1A, a database cluster 102 is provided to handle workloads from one or more clients that seeks to access a database through one or more application/web servers (e.g., nodes 1, 2, 3, . . . n). The database cluster includes clustered database storage 122, e.g., that is stored within multiple storage devices within a storage pool. The clustered database may have one or more tables that are operated upon by the one or more clients, where the clients operate one or more user stations to issue SQL commands to be processed by the database. The database cluster 102 includes multiple interconnected computers or servers that appear as if they are one server to the end users and applications that seek to access the database through the nodes 1-n. There is a one-to-many relationship between the underlying database stored within a storage: pool and the instances. Therefore, the data stored within the storage devices of the storage pool are commonly accessible by any of the nodes/instances that make up the cluster 102. The user stations and/or the servers within the system comprise any type of computing device that may be used to implement, operate, or interface with the database system. Examples of such devices include, for example, workstations, personal computers, mobile devices, servers, hosts, nodes, or remote computing terminals. The user station comprises a display device, such as a display monitor, for displaying a user interface to users at the user station. The user station also comprises one or more input devices for the user to provide operational control over the activities of the system, such as a mouse or keyboard to manipulate a pointing object in a graphical user interface to generate user inputs.

Each node in the database cluster may include one or more communications/storage devices or infrastructure, such as a network adapter, storage adapter, network monitor, and/or a cluster manager. The network adapter (e.g., network interface cards (NICs)) is a circuit board or card that is installed in a computer so that the computer can be connected to a network. A network adapter provides the computer with a dedicated, full-time connection to a network. Communications between the nodes of the database cluster are transmitted via the network adapters on each respective node via network communication channels(s). In some embodiments, the nodes may include multiple types of communication channels (e.g., network communication channel(s) and shared storage communication channel(s)) to communicate with other member nodes of the cluster. Each node of the cluster may be interconnected to one another via network communication channel(s) in order for the database cluster to operate properly, where each node within the cluster may be connected to the other member nodes in the cluster via network adapters installed/configured within the respective nodes. The network communication channel(s) may be implemented as a private network using a switch (or multiple switches) such that only the nodes in the cluster can access for network communications. In some embodiments, a network switch may be included to manage one or more network communication channels between a first set of network adapters and a second set of network adapters.

The storage adapter is a circuit board and/or integrated circuit adapter that provides input/output (I/O) processing and physical connectivity between a host system, or server, and a storage device. Examples of storage adapters may include a host bus adapter (HBA), and/or a Fibre Channel (FC) adapter. HBAs are typically defined by interconnect technology, speed, port count and system interface. An FC adapter is a hardware component that provides connectivity from a server to a storage area network (SAN). An FC adapter, which uses the Peripheral Component Interconnect (PCI) slots on the server, can include one or more ports. In some embodiments, communications between the nodes of the database cluster and the shared database(s) of the database cluster are transferred/transmitted over the configured shared storage communication channel(s) via at least the storage adapter(s) on respective member nodes of the database cluster. Shared storage communication channel is a different type of communication channel than the network communication channel. The shared storage communication channel connects the shared database with respective nodes of the database cluster via respective storage adapter(s) locally configured on each of the nodes.

Communication failures may occur between nodes in the cluster, e.g., due to hardware, software, and/or system workload problems. Various approaches may be taken to identify circumstances where a communications problem or failure has occurred. For example, network heartbeat processing can be used to determine whether one or more nodes in the database cluster has failed or is no longer communicatively available within the database cluster. For example, when a node within the database cluster fails because it has been powered down by accident or if it suddenly crashes before sending out any type of communication to notify other nodes that is failing. Because the particular node was not able to communicate its health/status via the network communication channel, no other node in the database cluster may be aware of its failure. Network heartbeat processing resolves these types of issues. Normal operations for network heartbeat processing is for each node to send out a heartbeat signal to all other nodes in the cluster and to record the heartbeat responses received. When a first node detects that a second node has not responded to its heartbeat after a period of time (e.g., timeout period), the first node may begin the eviction process, but only after waiting the expiration of the timeout period.

In general, database applications interact with a database server by submitting commands that cause the database server to perform operations on data stored in a database. For the database server to process the commands, the commands typically conform to a database language supported by the database server. An example of a commonly used database language supported by many database servers is known as the Structured Query Language (SQL). A database "transaction" corresponds to a unit of activity performed at the database that may include any number of different statements or commands for execution. ACID (Atomicity, Consistency, Isolation, Durability) is a set of properties that guarantees that database transactions are processed reliably. Atomicity requires that each transaction is all or nothing; if any part of the transaction fails, then the database state should not be changed by the transaction. Consistency requires that a database remains in a consistent state before and after a transaction. Isolation requires that other operations cannot see the database in an intermediate state caused by the processing of a current transaction that has not yet committed. Durability requires that, once a transaction is committed, the transaction will persist.

However, some or all of these properties may be violated if a failure occurs within the cluster, where nodes within the cluster become unable to communicate with one another. For example, as illustrated in FIG. 2, consider if a communications failure has occurred such that node 1 and node 2 are able to communicate with each other, but are unable to communicate with any other nodes in the cluster. Nodes 3-n are likewise able to communicate with each other, but are unable to communicate with nodes 1 and 2. This results in a sub-cluster 141 that is formed with two members—node 1 and node 2. A second sub-cluster 142 also exists which include members nodes 3-n. The problem is that if this situation is not properly addressed, then each sub-cluster thinks that it is the surviving set of nodes after the failure, and each sub-cluster will continue to independently process transactions on behalf of clients—without knowledge or coordination with the nodes and transactions being processed in the other sub-cluster. This may result in data inconsistencies within the database, which is unacceptable if the database is required to processed transactions in a reliable and consistent way.

Therefore, when a breakdown in communications occurs, there is often the need to identify which of the sub-clusters should be used to form the surviving cluster, with the nodes in the other sub-clusters being evicted from the cluster. This is typically implemented by electing one node from a sub-cluster as the master or leader node, and this master or leader node then initiates eviction processing on behalf of the cluster to evict the non-selected sub-cluster nodes.

As previously discussed, one possible approach that can be used is to identify the master node is to identify the node having the smallest/lowest node ID within the cluster as the master node, on the assumption that the node having the smallest node ID value is the first or earliest node started in the cluster. This selection criteria can be used as a first order selection criteria or as a tie breaker in the event of a tie from using other selection criteria. As previously noted, this approach may be overly simplistic and may not result in an optimal cluster, e.g., where selecting the master node with the smallest node ID may result in selection of a sub-cluster to survive having less members than a sub-cluster that is evicted.

Another possible approach is to use a heartbeat-based method, where heartbeat data is collected and analyzed to identify the members of the sub-clusters, and where the membership information is used to select the surviving sub-cluster. However, the problem with this approach is that the node-to-node network heartbeat may not accurately reflect the run time situation for collecting the cluster-wide node connectivity data, especially with a large size cluster and under heavy traffic load conditions. This is problematic since inaccurate cluster-wide node connectivity data may leads to an incorrect node eviction strategy.

With some embodiments of the present disclosure, priority-based messaging is used to achieve a consistent set of connectivity information (e.g., connectivity bit-vectors) among the nodes in the cluster. As illustrated in FIGS. 1A-D, multiple queues are established for messaging in the data cluster, including a high priority messaging queue 132 and a low/regular priority messaging queue 134. In general during ordinary operation, all messages transmitted in the cluster have the same priorities. What this means is that under heavy traffic load conditions, message carrying a network connectivity bit-vector may experience a significant delay due to all earlier "unimportant" messages that are competing for the same communication channel in the cluster. To beat other unimportant messages and trigger the correct cluster master election as soon as possible, the current embodiment will assign a higher priority to messages carrying the connectivity bit-vector 136. The high priority messages will move to the high priority queue 132 and process with the higher priority level.

Figure 1C:
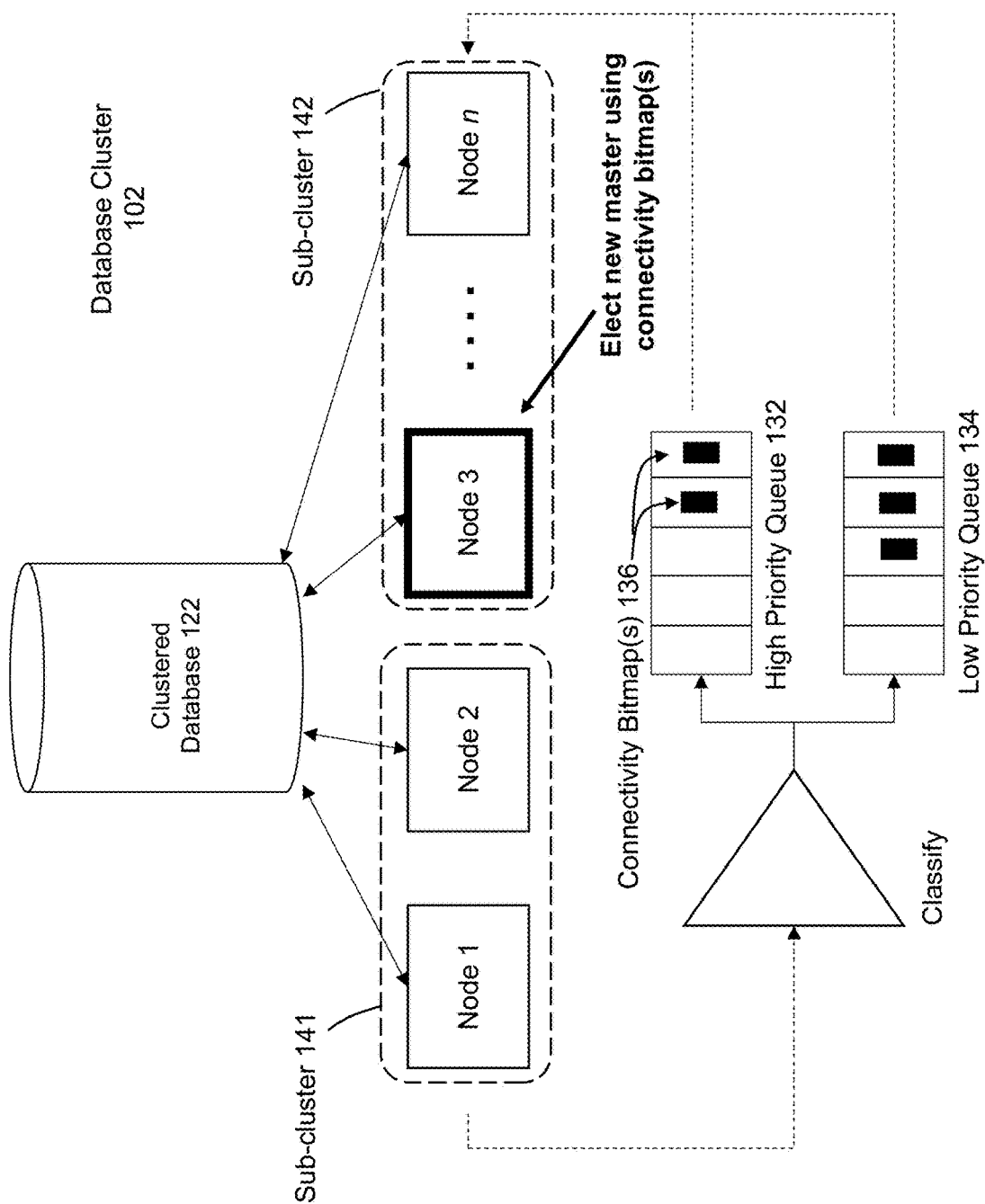
Figure 1D:
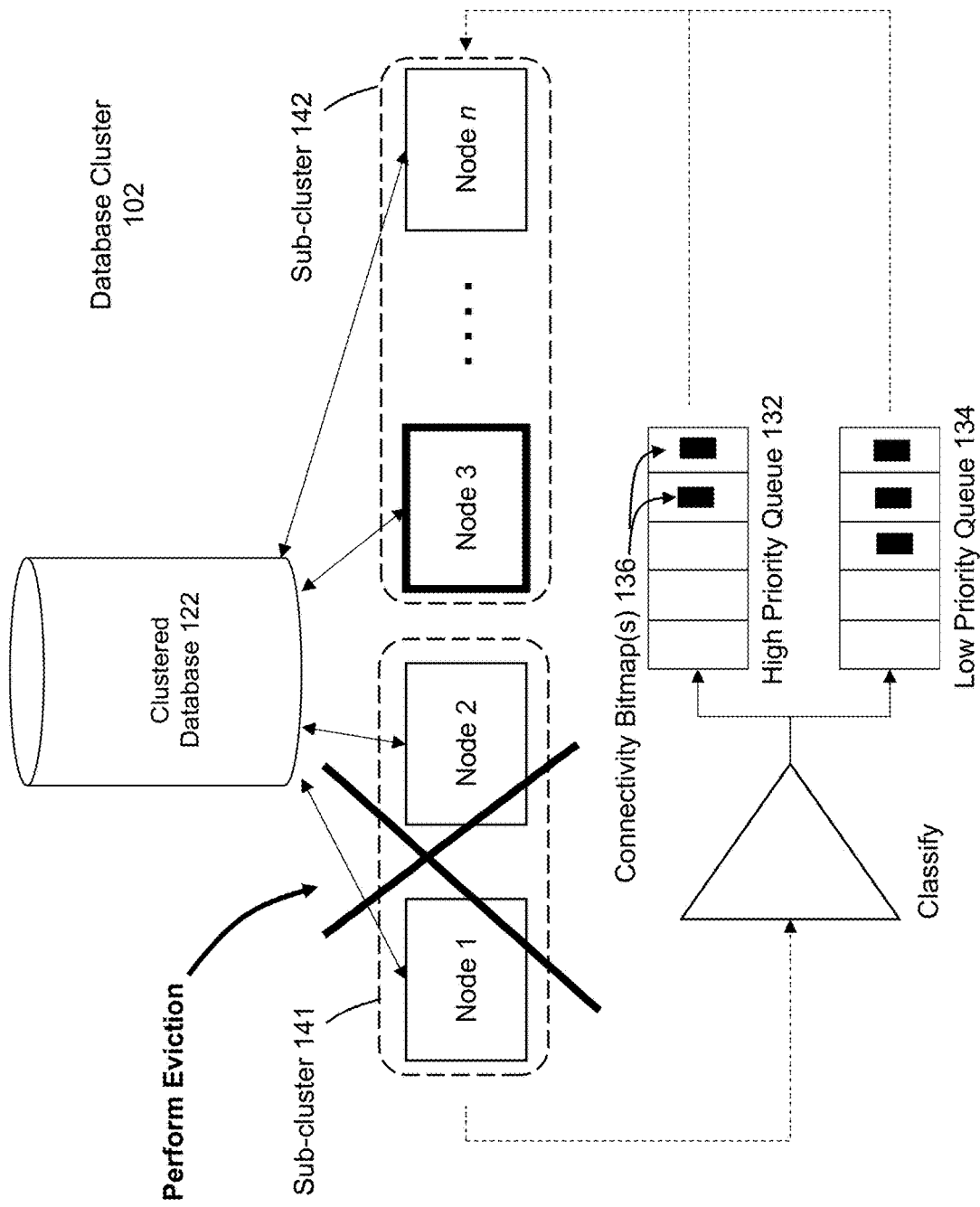

The advantage of this approach is that the prioritized messaging incurs less transmission latency from the communication channels as compared to other normal messages in a cluster. In a heavy network traffic load condition, this would be very useful in achieving consistency of network connectivity bit-vector across all nodes. As shown in FIG. 1C, a master election can then be performed more rapidly and correctly based on the consistent connectivity bit-vector 136 of each node that is transmitted across the cluster over the high priority queue 132. This will provide a guarantee of having an optimal cluster under the correct current status of the cluster, with the sub-cluster 141 having the smaller number of members being correctly identified and evicted as shown in FIG. 1D.

Figure 2A:
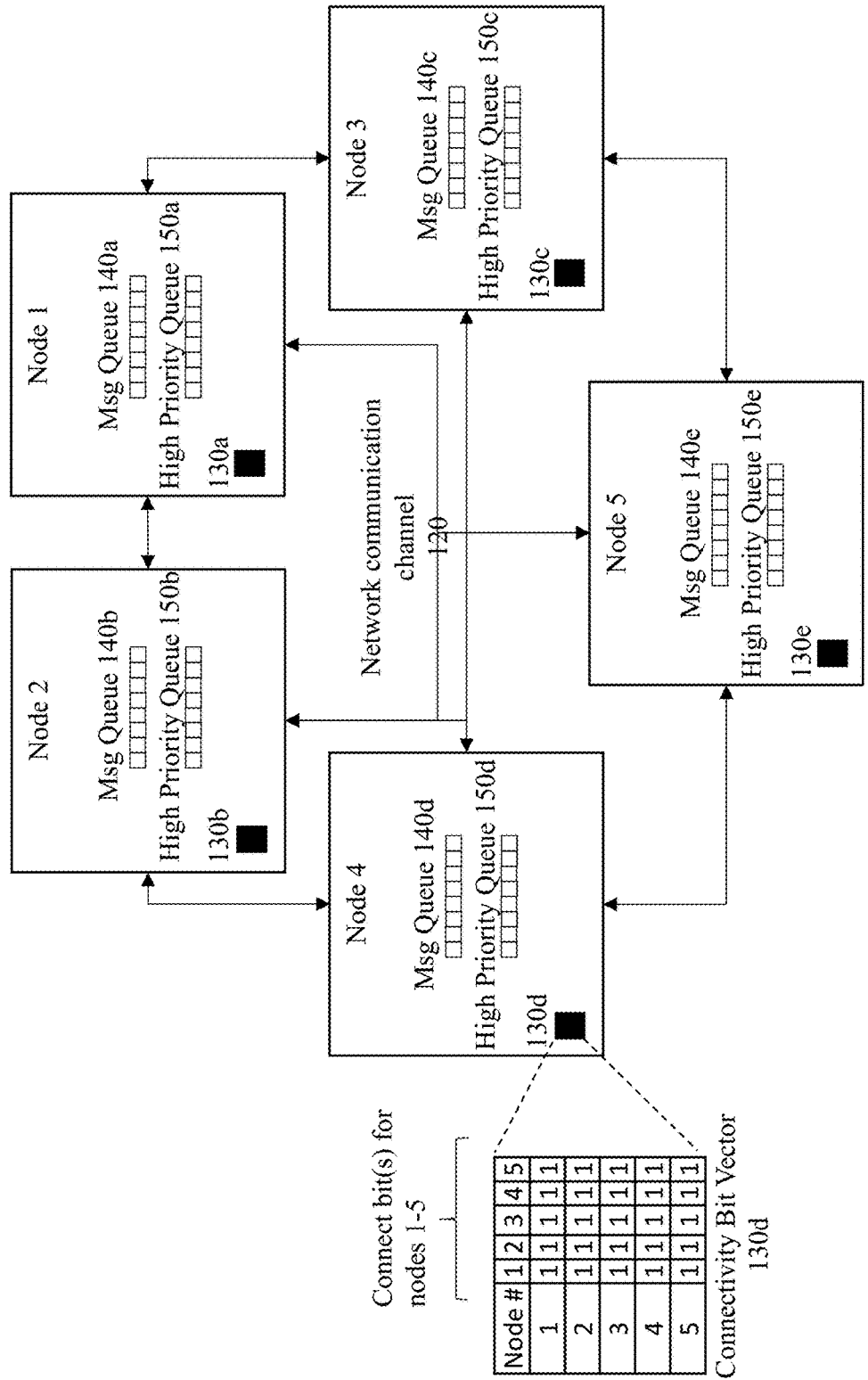
FIGS. 2A-2B provides an example illustration in a 5-node cluster.

FIG. 2A provides an example illustration in a 5-node cluster with node numbers 1, 2, 3, 4, and 5. Each node in the cluster is configured with interprocess communications mechanisms having both a high priority message queue 150 and a low/regular priority message queue 140.

In some embodiments, the messaging queues are implemented at an application level above the operating system. For example, a database application may implement its own interprocess communications facility to allow nodes to send messages to other nodes. By way of example, the Oracle RAC (Real Application Clusters) product provides a Grid Interprocess Communications (GIPC) to implement redundant interconnect usage among nodes in a cluster. This provides a private interconnect redundant network that permits nodes to communicate with one another independently of the OS-based IPC mechanisms. In effect, a cluster private network is established for the nodes in the cluster, such that messaging can occur over the private network. In some embodiments, any suitable IP-based protocol (e.g., IPv4 and IPv6) may be employed to implement the addressing configurations for the cluster private network. With embodiments of the invention, such application-level IPCs are configured to include multiple priority messaging queue levels, having a high priority queue 150 and a low priority queue 140. For example, this may be implemented by defining separate interconnect interfaces for each of these queues, with each interface being associated with a separate highly available IP address (HAIP),and where messages from the high priority queue are selected for processing ahead of any messages in the low priority queue.

In an alternate embodiment, the multiple messaging queues are established at the operating system level using OS-specific IPCs. For example, many operating systems establish message queues, which are data streams that allow multiple processes to read and write from these queues. With some embodiments of the invention, these OS-based message queue would include multiple tiers of priority, where the messages written to the high priority queue are read ahead of messages written into the lower priority queue. It is noted that at the OS-level, other types of IPCs may also be employed to implement he different levels of priority queues, e.g., using sockets, pipes, or shared memory.

An example connectivity bit vector 130*d* is shown in FIG. 2A. The connectivity bit vector 130*d* is represented as a columnar structure, where each row corresponds to a given node, and each column includes a bit that identifies a current communications status for that given node with another node. Here, since there are a total of five nodes, there are five columns with each column representing the communications status of nodes 1-5. A value of "1" indicates that communications are normal, while a value of "0" indicates a communications problem.

In the current figure, it is assumed that all communications are normal, with each node able to communicate with each other node in the cluster. Therefore, the value of each column is currently set to '1' for each node.

Figure 2B:
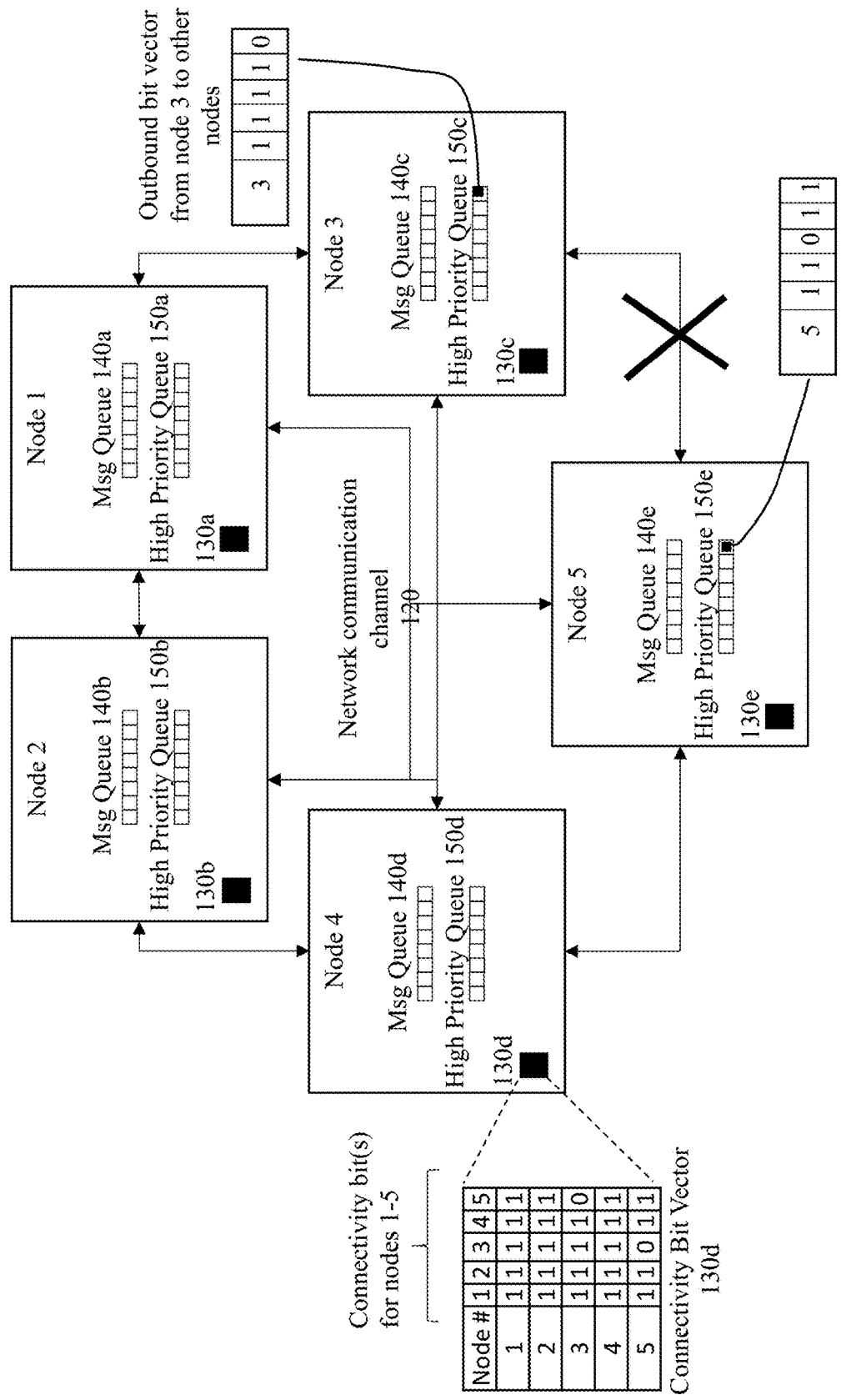

Assume, however, that a problem or failure occurs such that node 3 is no longer able to communicate with node 5. As illustrated in FIG. 2B, each of the affected nodes would communicate this problem to the other nodes using a connectivity bit vector, where the message is sent over the high priority message queue. Specifically, node 5 would send a message indicating a connectivity problem with node 3 (with a value of "0" in the column for node 3). Similarly, node 3 would send a message indicating a connectivity problem with node 5 (with a value of "0" in the column for node 5). At the nodes in the cluster, the respective connectivity bit vector representations would be updated to reflect this connectivity problem. For example, for connectivity bit vector 130*d* at node 4, the row for node 3 would have its value in column 5 changed from "1" to "0", to indicate the fact that node 3 is unable to communicatively connect with node 5. Similarly, the row for node 5 would have its value in column 3 changed from "1" to "0", to indicate the fact that node 5 is unable to communicatively connect with node 3.

Figure 3A:
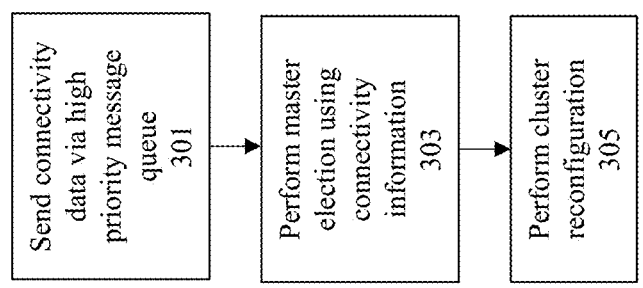
FIG. 3A shows a flowchart of an approach to implement some embodiments of the invention.

FIG. 3A shows a flowchart of an approach to implement some embodiments of the invention. At 301, connectivity data is sent between nodes using a high priority message queue. As described above, multiple queues are established for messaging in the database cluster, including at least a high priority messaging queue and a low/regular priority messaging queue. Connectivity data, such as a connectivity bit vector, is transferred using the high priority message queue, where the connectivity data includes information describing the connection of one node to another. The prioritized messaging will be sent by a node who wants to become the reconfiguration master. The message will contain the connectivity bit-vector of the node and will be transmitted with the higher priority. With the best effort, the critical data should be arrived in time to be used in the decision making of master election.

Step 303 is performed to implement election of a master node. The master node may be employed as a "reconfiguration" master node, to implement reconfiguration of the database cluster. The connectivity data is employed to identify the optimal sub-cluster from which the master node is selected. In particular, the bit vector data is used to identify the sub-cluster having the largest number of members. From that sub-cluster, the master node is then elected, e.g., from the node in that sub-cluster that identified the communications problem and/or sought to be the master node.

Thereafter, at 305, cluster reconfiguration is performed. Reconfiguration of member nodes of the database cluster is a process that ensures there is consensus amongst all member nodes of the database cluster as to which nodes are member nodes of the database cluster at a particular point in time. In some embodiments, the clustered database system includes cluster management infrastructure that store metadata about the status of member nodes in the database cluster. The cluster management data structure may include a node status data structure, where in some embodiments, the node status data structure includes a field, if marked appropriately, which indicates that the node associated to that field is to be evicted. The reconfiguration master node may use these data structure to identify/mark which if any of the nodes in the cluster are to be evicted. Eviction of a node results in the removal of that node from being considered a member of that cluster.

A cluster manager may be configured on each node of the cluster to implement some or all of the above steps. The cluster manager is configured to manage the functionalities of the database cluster for the respective nodes in the database cluster, and which provides the infrastructure necessary to run the database cluster. Cluster managers also manages resources, such as virtual IP (VIP) addresses, databases, listeners, services, and so on. The cluster manager may manage the cluster configuration by controlling which nodes are members of the cluster and by notifying members when a node joins or leaves the cluster. Additionally, a cluster manager on each member node of a database cluster may be configured to provide heartbeat processing of the shared storage communication channel(s) on a frequent basis by writing into node status data structure to record node status information/heartbeat information into their respective portions of the node status data structure. Furthermore, in some embodiments, the cluster manager may provide the interprocess communications infrastructure that hosts the high priority message queue.

Figure 3B:
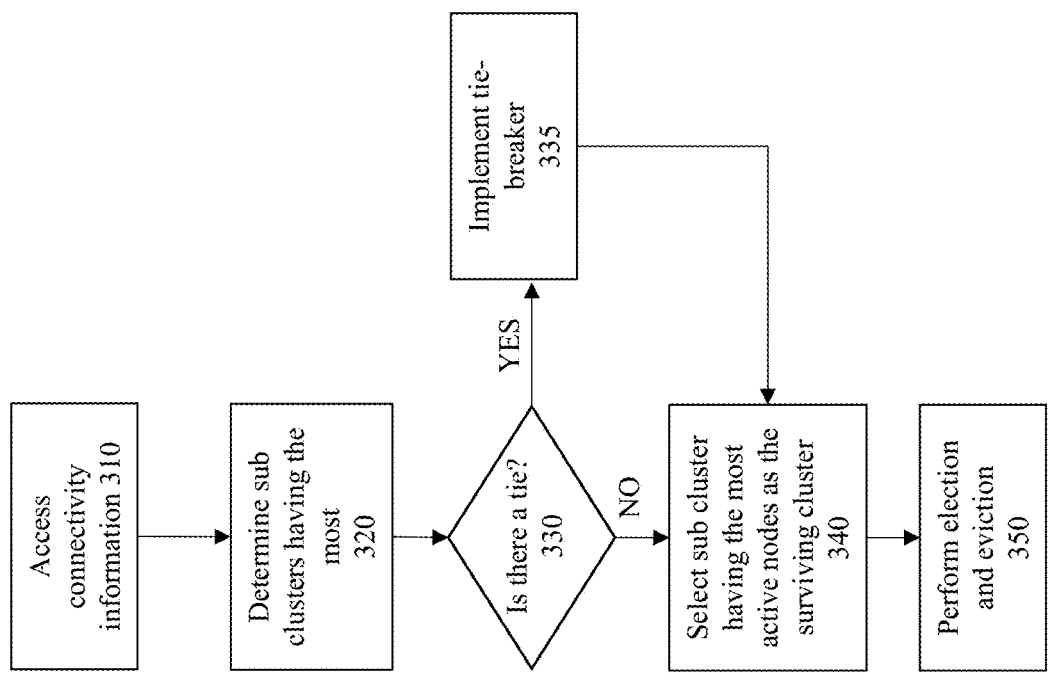
FIG. 3B shows a more detailed flowchart of an approach to implement reconfigurations according to certain embodiments of the invention.

FIG. 3B shows a more detailed flowchart of an approach to implement reconfigurations according to certain embodiments of the invention. At 310, connectivity information is accessed for the nodes in the cluster. The connectivity information is implemented, for example, as a bit vector that includes a bit for each node within the cluster. At step 320, a determination is made of the sub-cluster having the largest number of members. This is performed, for example, by grouping the nodes based upon their ability to connect with one another to identify the sub-clusters within the cluster. This action is taken to identify which nodes belong to which sub-cluster. Once the members of the sub-clusters are identified, the number of nodes as members of each sub-cluster is considered to identify the sub-cluster having the greatest number of members.

A determination is made at step 330 whether there is a tie in the number of members of the largest sub-clusters. If not, then at 340, the sub-cluster having the largest number of members is selected as the surviving sub-cluster. Thereafter, at 350, one of the nodes within the surviving sub-cluster is elected as the master node. This selection may be upon any suitable criteria. The master node may then commence reconfiguration by evicting the members of the other sub-clusters.

If at step 330 a tie is identified, then a tie breaker may be implemented. For example, the node having the lowest node ID within the identified cluster may be selected as the master node. Alternatively, historical data and/or machine learning may be used to identify the optimal sub-cluster as the surviving cluster in the event of a tie. U.S. application Ser. No. 16/457,445, (which is hereby incorporated by reference in its entirety), provides an example approach that may be used in the event of a tie, where machine learning is applied to select an optimal sub-cluster.

FIG. 4 shows an illustration of an embodiment of the invention with an example cluster configuration of a four node cluster that includes nodes 1, 2, 3, and 4. In this example, nodes 1 and 2 are not connected to each other but both of them are connected to node 3. Node 4 is connected to both nodes 2 and 3.

As such, this cluster currently has one or more connectivity problems that have been identified. As such, both node 1 and 2 attempt to start a cluster reconfiguration to resolve the situation. Assume that these two nodes attempt to start the cluster reconfiguration at around the same time, with either node 1 starting slightly earlier or the critical message from node 2 being delayed in a heavy network load condition.

Here, it can be seen that there are two sub-clusters can be formed. A first sub-cluster includes nodes 1 and 3 since these nodes can talk to one another. A second sub-cluster includes nodes 2, 3, and 4 since these nodes can all talk to one another.

In this situation without the invention, a sub-optimal situation may develop. For example, node 3 may set the node 1 as the reconfiguration manager node and may not timely see the similar mastership request from Node 2. Even if a lower numbered node is used as a tie breaker, it still results in a non-optimal smaller cluster with only node 1 and 3 instead of node 2, 3 and 4.

However, with embodiments of the invention, the prioritized messaging approach is employed by a node who wants to become a reconfiguration master. The message will contain the connectivity bit-vector of the node and will be transmitted with the higher priority. With the best efforts, the critical data should arrive in time to join node 3's decision making for the master election. The bit-vectors from all four nodes are shown in the table of FIG. 4. From the bit-vectors, node 3 will see two different options for the new surviving cluster, where the first is for the sub-cluster having nodes 1 and 3, and where node 1 is set as master for nodes 1 and 3. The other option is for the sub-cluster having nodes 2, 3, and 4, and where node 2 as set as master of this sub-cluster. Since the size of the option for node 2 is higher, this results in election of node 2 as the reconfiguration master. The new surviving cluster will have three nodes (nodes 2, 3, and 4), which provides more computing power than the other sub-cluster having two nodes (nodes 1 and 3).

Therefore, what has been disclosed is an improved approach for performing elections in a database cluster, where cluster topology representations are distributed across the cluster nodes using a prioritized messaging protocol. The cluster topology representations may be implemented as connectivity bit-vector that provide information that identifies which nodes in the cluster are able to communicatively connect with other nodes. After a failure, this information permits identification and election of a master node in a sub-cluster having the largest number of members that can talk to one another, where eviction can then take place for nodes in the other sub-cluster(s) having smaller number of members.

SYSTEM ARCHITECTURE OVERVIEW

Figure 5:
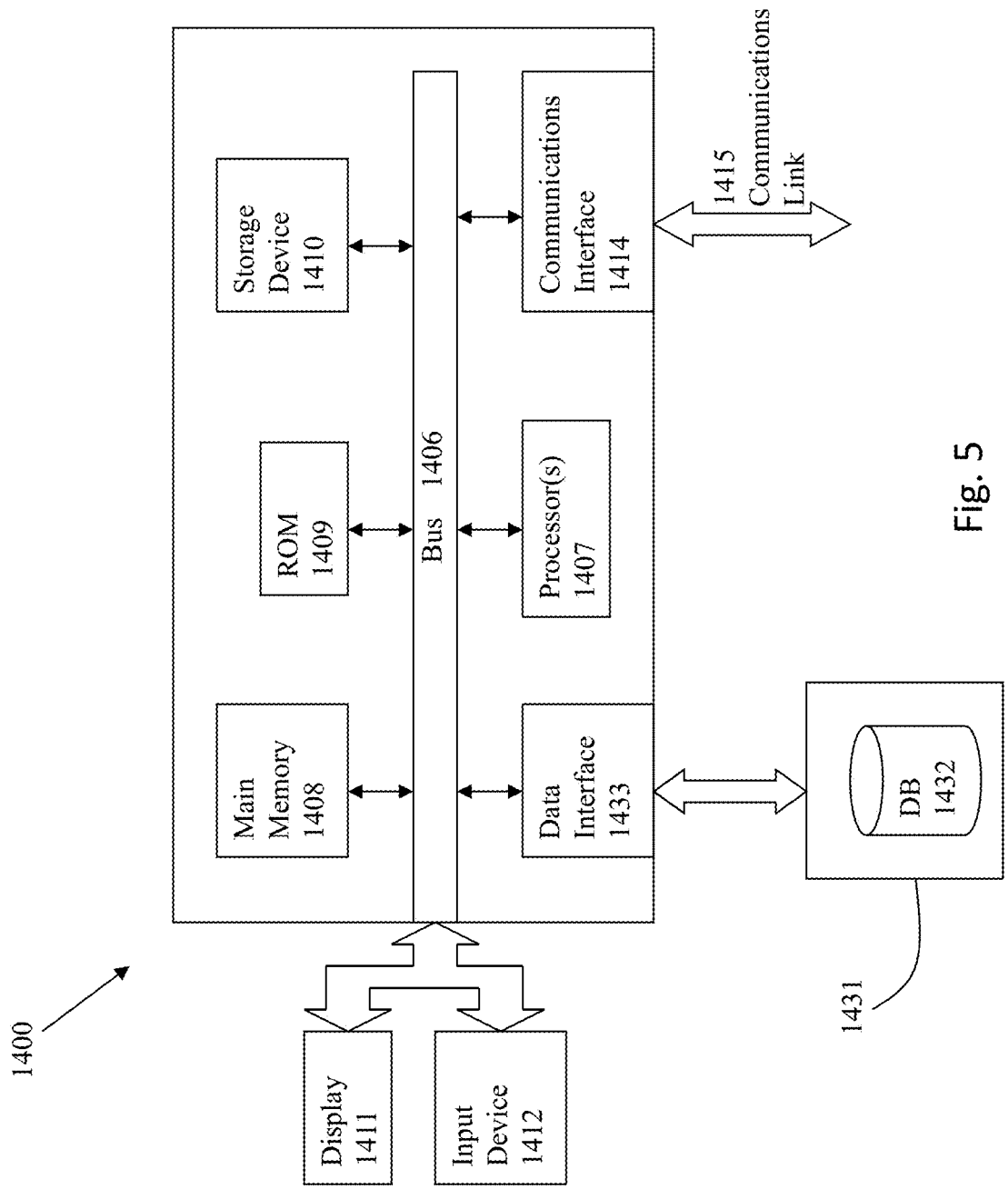
FIG. 5 is a block diagram of an illustrative computing system suitable for implementing an embodiment of the present disclosure.

FIG. 5 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 6:
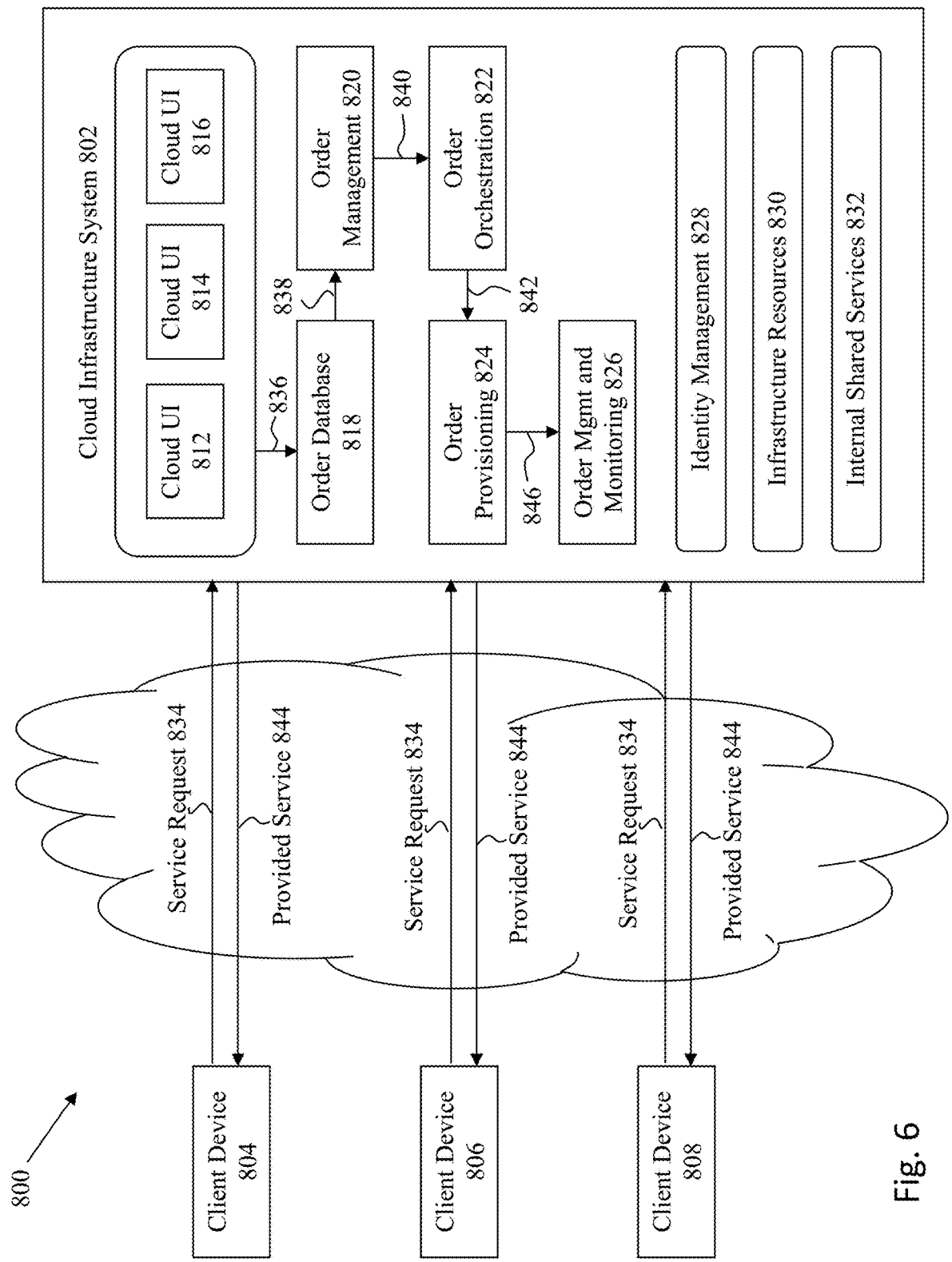
FIG. 6 is a block diagram of one or more components of a system environment by which services provided by one or more components of an embodiment system may be offered as cloud services, in accordance with an embodiment of the present disclosure.

FIG. 6 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 5. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloudservices via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A computer-implemented method, comprising:
    sending connectivity information between nodes in a database cluster using a first messaging queue having a higher messaging priority than a second messaging queue, wherein messages from the first messaging queue are selected for processing ahead of messages in the second messaging queue and the first messaging queue and the second messaging queue are part of a messaging infrastructure in the database cluster;
    performing a master node election to elect a master node based at least upon the connectivity information that was sent using the first messaging queue having the higher messaging priority than the second messaging queue, wherein the master node is within a first sub-cluster; and
    performing a cluster reconfiguration that evicts one or more nodes from a second sub-cluster.

2. The method of claim 1, wherein the connectivity information comprises a bit vector comprising a bit that represents a connection between two nodes.

3. The method of claim 2, wherein the a bit vector comprises a columnar structure where a row corresponds to a given node, and the row corresponds to one or more columns that include a bit value that represents the connection between the given node and one or more other nodes.

4. The method of claim 1, wherein the messaging infrastructure in the database cluster comprises an application-level interprocess communications mechanism.

5. The method of claim 1, wherein the first messaging queue corresponds to lower transmission latency from communication channels as compared to the second messaging queue.

6. The method of claim 1, wherein performing the master node election to elect the master node is further based on the first sub-cluster having more member nodes than the second sub-cluster.

7. The method of claim 1, further comprise using a tiebreaker to break a tie between the first sub-cluster and the second sub-cluster.

8. A computer program product embodied on a computer readable medium, the computer readable medium having stored thereon a sequence of instructions which, when executed by a processor causes a set of acts comprising:
    sending connectivity information between nodes in a database cluster using a first messaging queue having a higher messaging priority than a second messaging queue, wherein messages from the first messaging queue are selected for processing ahead of messages in the second messaging queue and the first messaging queue and the second messaging queue are part of a messaging infrastructure in the database cluster;
    performing a master node election to elect a master node based at least upon the connectivity information that was sent using the first messaging queue having the higher messaging priority than the second messaging queue, wherein the master node is within a first sub-cluster; and
    performing a cluster reconfiguration that evicts one or more nodes from a second sub-cluster.

9. The computer program product of claim 8, wherein the connectivity information comprises a bit vector comprising a bit that represents a connection between two nodes.

10. The computer program product of claim 9, wherein the a bit vector comprises a columnar structure where a row corresponds to a given node, and the row corresponds to one or more columns that include a bit value that represents the connection between the given node and one or more other nodes.

11. The computer program product of claim 8, wherein the messaging infrastructure in the database cluster comprises an application-level interprocess communications mechanism.

12. The computer program product of claim 8, wherein the first messaging queue corresponds to lower transmission latency from communication channels as compared to the second messaging queue.

13. The computer program product of claim 8, wherein performing the master node election to elect the master node is further based on the first sub-cluster having more member nodes than the second sub-cluster.

14. The computer program product of claim 8, wherein the set of acts further comprise using a tiebreaker to break a tie between the first sub-cluster and the second sub-cluster.

15. A system, comprising:
a memory for storing a set of instructions; and
a processor that executes the set of instructions, which when executed, cause a set of acts comprising:
sending connectivity information between nodes in a database cluster using a first messaging queue having a higher messaging priority than a second messaging queue, wherein messages from the first messaging queue are selected for processing ahead of messages in the second messaging queue and the first messaging queue and the second messaging queue are part of a messaging infrastructure in the database cluster;
performing a master node election to elect a master node based at least upon the connectivity information that was sent using the first messaging queue having the higher messaging priority than the second messaging queue, wherein the master node is within a first sub-cluster; and
performing a cluster reconfiguration that evicts one or more nodes from a second sub-cluster.

16. The system of claim 15, wherein the connectivity information comprises a bit vector comprising a bit that represents a connection between two nodes.

17. The system of claim 16, wherein the a bit vector comprises a columnar structure where a row corresponds to a given node, and the row corresponds to one or more columns that include a bit value that represents the connection between the given node and one or more other nodes.

18. The system of claim 15, wherein the messaging infrastructure in the database cluster comprises an application-level interprocess communications mechanism.

19. The system of claim 15, wherein the first messaging queue corresponds to lower transmission latency from communication channels as compared to the second messaging queue.

20. The system of claim 15, wherein performing the master node election to elect the master node is further based on the first sub-cluster having more member nodes than the second sub-cluster.

21. The system of claim 15, wherein the set of acts further comprised using a tiebreaker to break a tie between the first sub-cluster and the second sub-cluster.

* * * * *

UNITED STATES PATENT AND TRADEMARK OFFICE
CERTIFICATE OF CORRECTION

PATENT NO. : 11,108,700 B2
APPLICATION NO. : 16/457368
DATED : August 31, 2021
INVENTOR(S) : Zhu et al.

It is certified that error appears in the above-identified patent and that said Letters Patent is hereby corrected as shown below:

On the Title Page

On page 2, Column 2, item (56) under Other Publications, Line 3, delete "Conferemce" and insert -- Conference --, therefor.

On page 2, Column 2, item (56) under Other Publications, Line 16, delete "Micosoft" and insert -- Microsoft --, therefor.

In the Drawings

On sheet 8 of 11, in FIG. 3B, under Reference Numeral 320, Lines 1-2, delete "sub clusters" and insert -- sub-clusters --, therefor.

On sheet 8 of 11, in FIG. 3B, under Reference Numeral 340, Line 1, delete "sub cluster" and insert -- sub-cluster --, therefor.

In the Specification

In Column 3, Line 64, delete "storage:" and insert -- storage --, therefor.

In Column 6, Line 66, delete "application level" and insert -- application-level --, therefor.

In Column 7, Line 48, delete "'1'"" and insert -- "1" --, therefor.

In Column 9, Line 28, delete "16/457,445," and insert -- 16/457,445 --, therefor.

In Column 11, Line 4, delete "PTSN," and insert -- PSTN, --, therefor.

In Column 12, Line 28, delete "cloudservices" and insert -- cloud services --, therefor.

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*

In Column 13, Line 33, delete "cloudservices" and insert -- cloud services --, therefor.

In the Claims

In Column 16, Line 15, in Claim 3, delete "the a" and insert -- the --, therefor.

In Column 16, Line 59, in Claim 10, delete "the a" and insert -- the --, therefor.

In Column 18, Line 9, in Claim 17, delete "the a" and insert -- the --, therefor.

In Column 18, Line 25, in Claim 21, delete "comprised" and insert -- comprise --, therefor.